Sept. 18, 1956　　F. U. HAUBOURDIN ET AL　　2,763,347
CLUTCH CONTROL FOR MOTOR VEHICLES
Filed May 8, 1951　　　　　　　　　　　　5 Sheets-Sheet 2
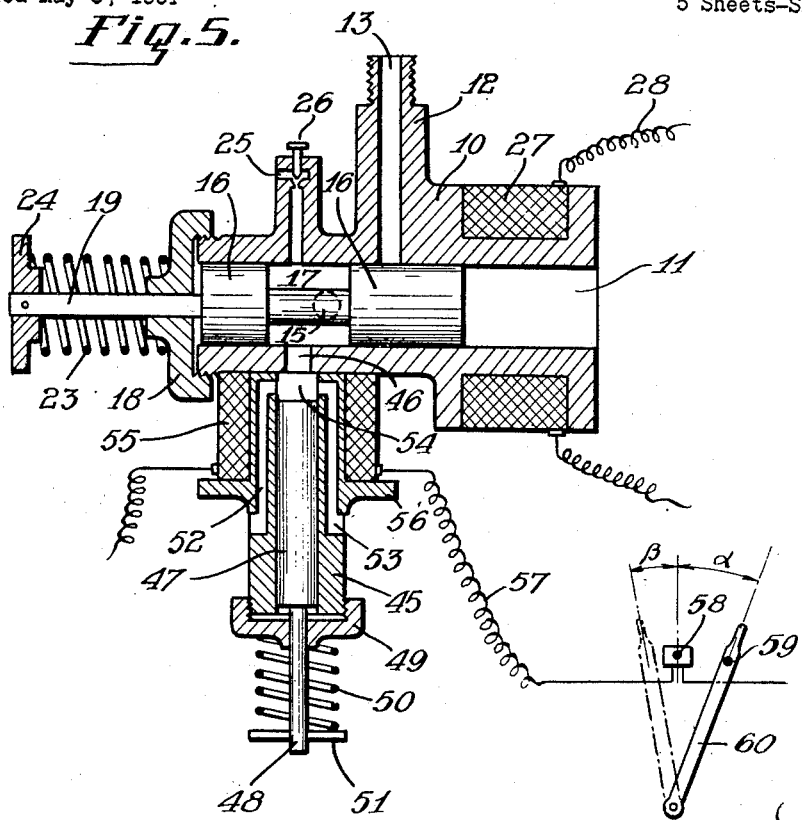
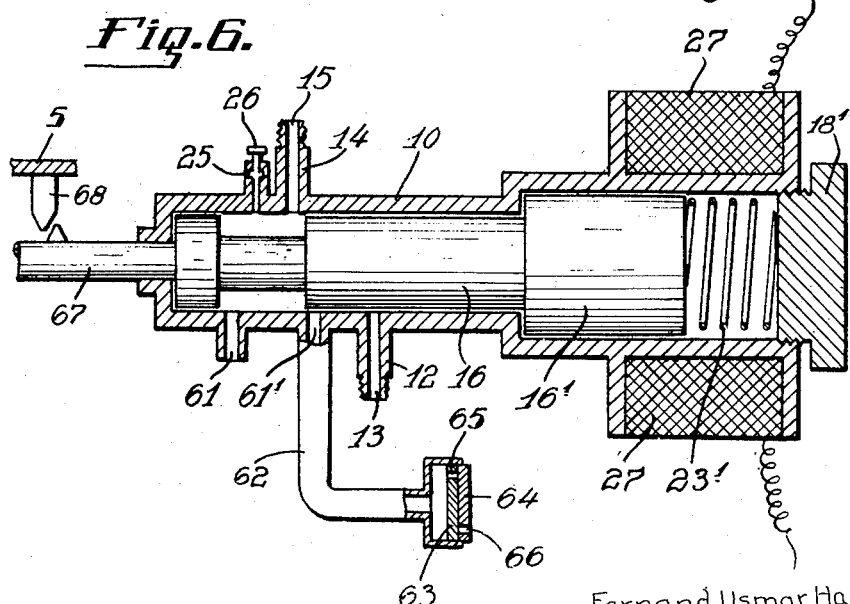
Fernand Usmar Haubourdin
Robert Jean Achille Rolland
INVENTORS
By Richardson, David and Nordon
their ATTYS.

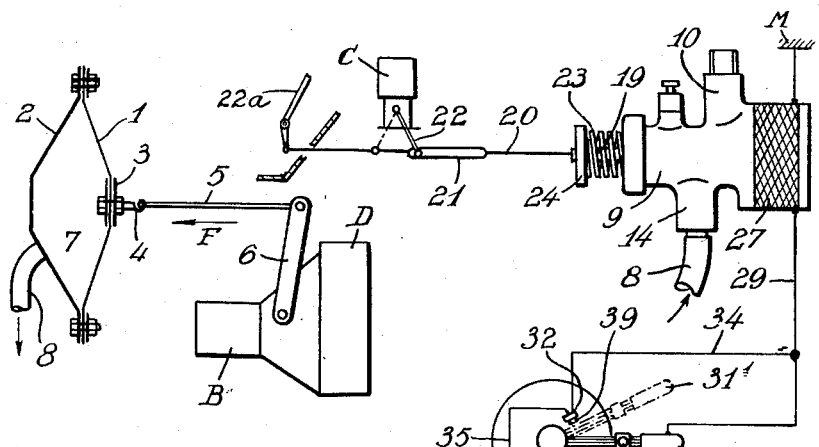
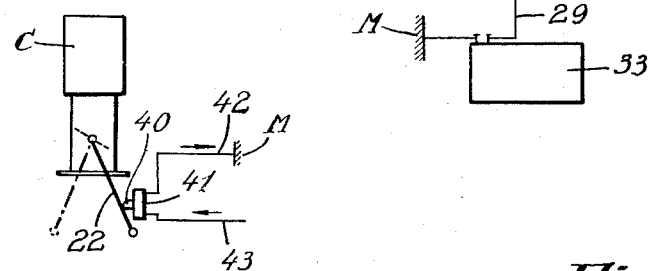
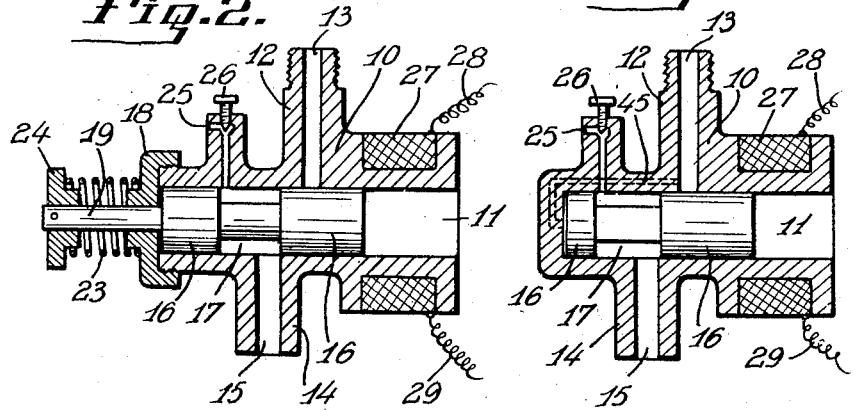
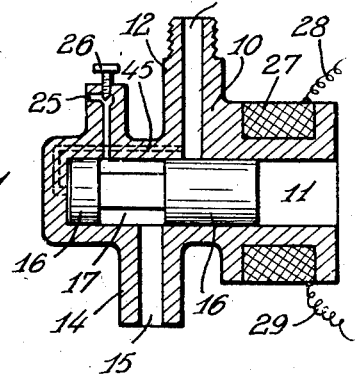

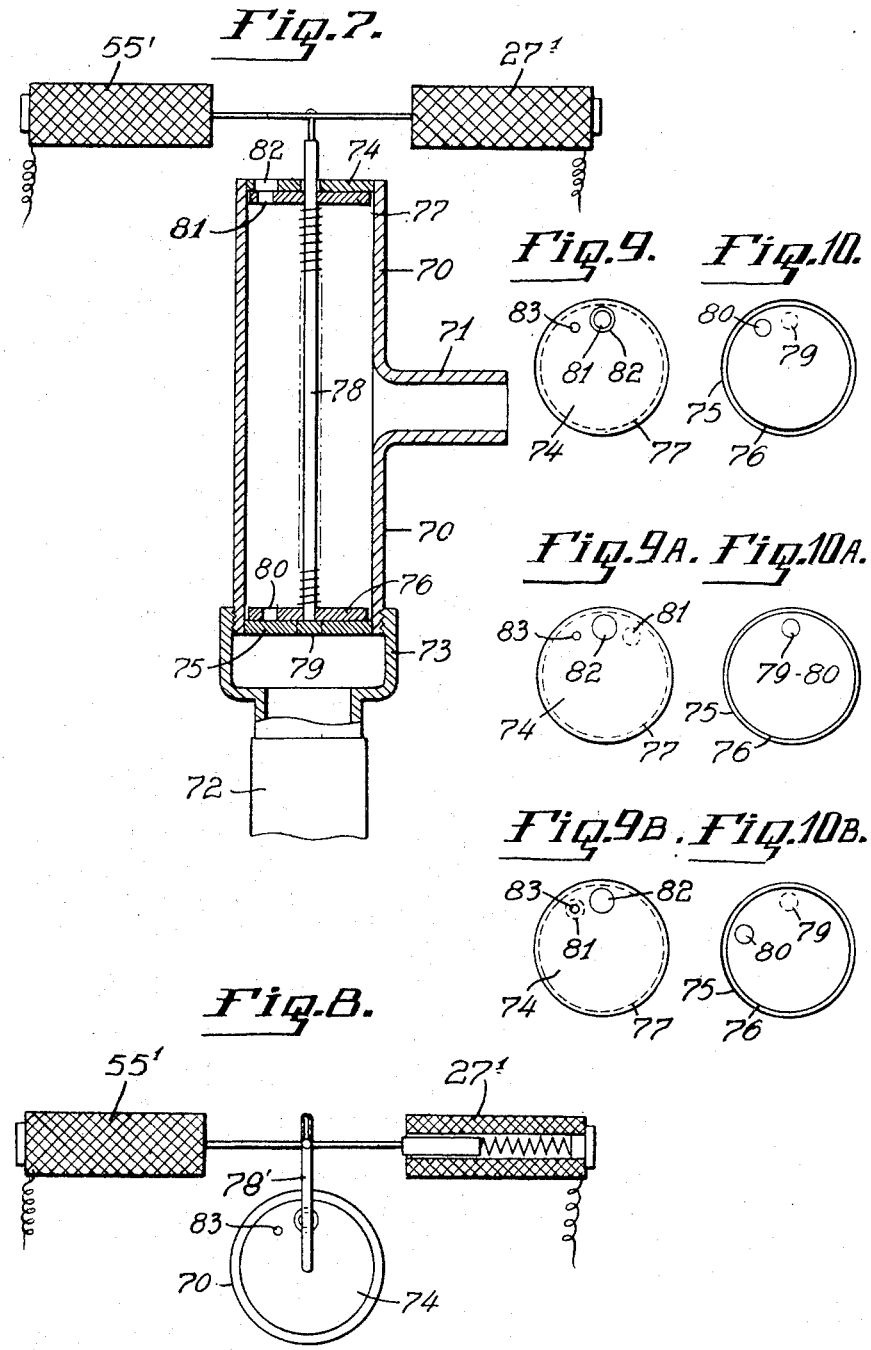

Sept. 18, 1956  F. U. HAUBOURDIN ET AL  2,763,347
CLUTCH CONTROL FOR MOTOR VEHICLES
Filed May 8, 1951  5 Sheets-Sheet 4
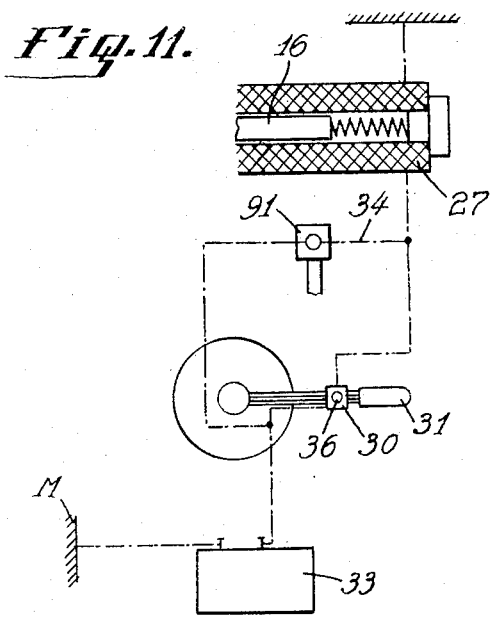
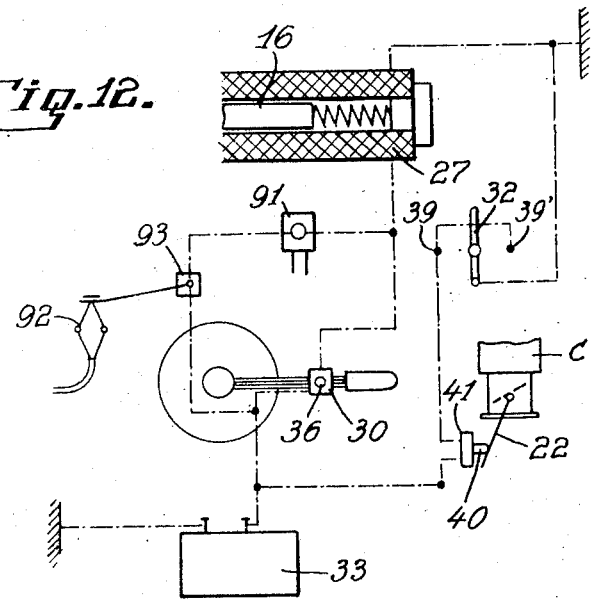
Fernand Usmar Haubourdin
Robert Jean Achille Rolland
INVENTORS
By Richardson, David and Nordon
their ATTYS.

United States Patent Office 2,763,347
Patented Sept. 18, 1956

2,763,347

CLUTCH CONTROL FOR MOTOR VEHICLES

Fernand Usmar Haubourdin, Ghent, and Robert Jean Achille Rolland, Brussels, Belgium Application May 8, 1951, Serial No. 225,216

Claims priority, application Belgium May 13, 1950

7 Claims. (Cl. 192—.052)

Our invention has for its object a clutch control incorporating considerable improvements with reference to the known systems operated by the depression in the engine manifold, said clutch control being also applicable to diesel engines driving motor vehicles.

As a matter of fact, our improved control system retains for the vehicle provided with such a clutch all the advantages of normal disc and plate clutches while also ensuring automatic starting and possibility of change in speed without declutching, to wit:

a. Normal operation of the vehicle at all speeds, in other words, the vehicle is not automatically set under free wheeling conditions as soon as the accelerator is released, except for the starting speed, this not being the case in the systems known hitherto of the type wherein the clutch is controlled through the depression in the engine manifold.

b. Starting automatically after setting the change speed lever into the location corresponding to the starting speed, through mere depression of the accelerator pedal and without moving the clutch pedal.

c. Passing through all other speeds without requiring the use of the pedal clutch and through mere operation of the change speed lever.

d. Retaining for normal running speeds although, as disclosed hereinabove, the clutch pedal is not necessary, the possibilities of braking through the operation of the engine against the forward movement of the vehicle, i. e. when the accelerator is released. This allows retaining permanently without any preliminary operation being required, the vehicle wheels under control instead of their being under free wheeling conditions, which means complete stability of the vehicle and possibility of braking the latter through the engine in sharp declivities which was not the case in prior systems operating through depression in which the engine was declutched and the wheel was free as soon as the accelerator pedal was released.

e. The clutch is not released during the idling of the engine while the gear lever is in its neutral inoperative position which means perfect conditions for keeping the thrust bearing of the clutch in proper state in spite of intense travelling in large cities where it is constantly necessary to stop at crossings while the motor continues revolving.

f. The execution is extremely simply, while involving only a low cost.

g. It is readily applicable to all existing vehicles provided with a conventional clutch and a mechanical change speed gear.

h. Lastly, in spite of the above, it is still possible to start the engine while retaining freedom of both hands, i. e. one hand remains on the change speed lever at the moment of the starting which renders operation extremely simple.

This latter point is important and constitutes one of the chief advantages of the invention. As a matter of fact, whereas we wish to retain the advantages of conventional clutches, as far as road behaviour is concerned, together with the possibility of braking through the engine and of the possibility of not being declutched for the neutral inoperative position of the change speed lever, when the engine is idling, it is furthermore necessary to allow the engine to remain declutched at starting speed to provide for automatic starting without the driver being obliged to leave his hand on the knob controlling the declutching that is carried by the change speed lever, whereby the driver retains the entire freedom of use of both hands.

We will now disclose our invention with further detail, reference being made to accompanying drawings illustrating a preferred embodiment of the object of our invention, it being understood, of course, that the details disclosed are given by way of a mere exemplification.

In said drawings:

Fig. 1 is a sketch illustrating the principle of the invention, the two parts connected by the pipe 8 being shown separately;

Fig. 3 illustrates a detail modification thereof;

Figs. 2, 4, 5, 5A and 6 illustrate various embodiments of the actual distributor incorporated to our improved clutch control;

Figs. 7 and 8 illustrate a modification;

Figs. 9, 9A, 9B and 10, 10A, 10B are explanatory diagrams;

Figs. 11 and 12 are wiring diagrams adapted for use with the object of our invention.

Figure 5A:
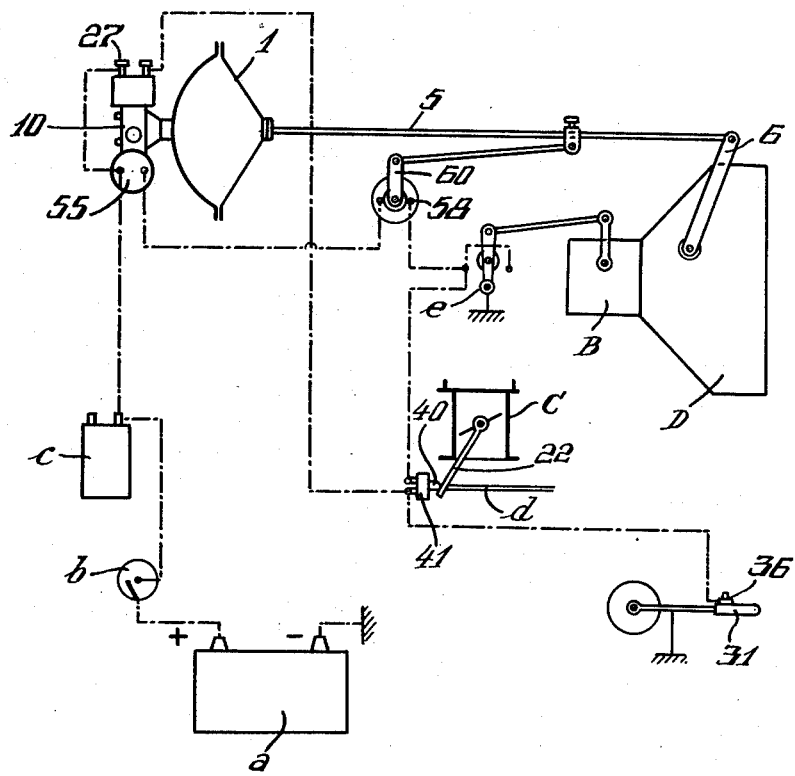

We have shown at 1 in Fig. 1 a strong diaphragm fluid-tightly carried by a concave stamped sheet metal part 2. Said diaphragm 1 carries a metal plate 3 to which is secured a hook 4 actuating through the agency of a metal rod 5 or of a cable the lever 6 controlling the spindle of the clutch disc of the vehicle.

The change speed gear is illustrated at B and the clutch casing at D.

According to the invention, the chamber 7 formed between the diaphragm 1 and the metal sheet 2 carrying same, is connected through a pipe 8 with an obturator or distributor 9 illustrated only diagrammatically on the right hand side of Fig. 1 and that includes, as shown in Fig. 2, a metal casing 10 provided throughout its length with a bore 11 (Fig. 2). The body 10 is provided on one hand with a projection 12 (Fig. 2) that is inwardly bored at 13 for connecting the bore 11 with the admission pipe of the engine while said body is provided on the other hand with a further projection 14 also bored at 15 for connection with the pipe 8 opening into the chamber 7.

Inside the bore 11 may slide, with slight friction, a piston 16 that is provided in its medial portion with a peripheral groove 17 whereby the piston 16 is adapted to connect through said groove the bores 13 and 15 or to cut off said connection according to the position assumed by said piston.

At one of its angles, the body 10 is closed by a nut 18 through which passes the piston rod 19 of the piston 16. This extension or piston rod 19 engages a rod 20 (Fig. 1) provided with an elongated slot 21 in which is engaged for free sliding motion the end of the throttle lever 22 of carburetor C which is connected to the small accelerator pedal 22a controlling the opening of the throttle valve of the carburettor C. Round the extension 19 is also mounted a spring 23 that is held between the nut 18 and a further nut or plug 24 secured to said extension 19.

The metal body 10 of the distributor is furthermore provided with a bore 25 for the input of air that connects the bore 11 with the outer atmosphere; an adjustable needle valve 26 is secured to the body 10 and allows a slow input of air through the pipe 25.

A solenoid 27 surrounds one end of the cylindrical body 10 and is connected by a wire 29 with a switch 30 controlling the current from the storage battery 33, said switch being carried by the change speed lever 31. Another switch 32 is mounted in a manner such that it allows the passage of current from the battery through the wires 34 and 35 towards the solenoid 27 when the change speed lever is set in the position corresponding to the starting of the vehicle, which position is generally that 31¹ corresponding to first speed.

The operation of the arrangement is as follows: supposing the engine revolves under idling conditions, the clutch disc is locked on the plate and the change speed gear is inoperative in the position corresponding to neutral.

When it is desired to obtain first speed, the contact knob 36 controlling the switch 30 on the change speed lever 31 is depressed so as to allow current to flow from the battery 33 towards the solenoid 27. The piston 16 forming the armature of the solenoid 27 is consequently drawn towards the right hand side of the distributor illustrated in Fig. 2 and thereby connection is provided between the bores 13 and 15 through the groove 17. Thus, the chamber 7 is connected with the admission pipe and vacuum is produced behind the diaphragm 1 which latter is drawn towards the concave metal sheet 2.

This draws in its turn rearwardly the lever 5 controlling, as disclosed, the thrust bearing of the clutch, said lever being drawn in the direction of the arrow F (Fig. 1) whereby the vehicle is declutched.

It is then possible for the driver to obtain the desired speed while retaining his hand on the switch 36. As soon as the lever 31 is in its position providing the starting speed, it engages the knob 39 controlling the switch 32 which ensures the passage of current through said switch towards the solenoid 27. It is then possible to release the switch 36 on the lever 31 as the vehicle remains declutched by reason of the piston 16 remaining attracted by the solenoid 27 and the diaphragm 1 remaining submitted to depression.

If it is desired to start at this moment, it is sufficient to act on the accelerator lever as, the piston 16 being in its right hand side position, it has also drawn the elongated slot 21 towards the right hand side, i. e. almost into abutment with the accelerator lever 22 that has been previously drawn towards the right hand side into the idling position illustrated in solid lines in Fig. 1. As soon as acceleration is provided, the accelerator lever urges the elongated slot 21 towards the left. As the elongated slot is associated with the piston rod 19, the piston 16 is drawn towards its left hand position whereby connection between the bores 13 and 15 is cut off. Consequently, the diaphragm is no longer submitted to depression and the outer air enters under control of the adjustable needle valve 26, the bore 25 communicating with the bore 11 and the pipe 8 so as to gradually fill the chamber 7 underneath the diaphragm 1 with air. The latter resumes its original position under the action of the clutch springs operating through the rod 5 and the lever 6. Thus, the clutch is gradually energized and the vehicle starts.

This mechanically controlled starting device is described for sake of clarity, but, in practice, it is generally executed, when incorporated to the arrangement forming the object of the invention, through the agency of an electric contact system as illustrated in Fig. 3.

In this case, the accelerator lever 22 controlled by the accelerator may act on the knob 40 actuating in its turn a switch 41 grounded through a wire 42 at M and connected through a wire 43 with one end of the solenoid 27 whereby the passage of current between said end of the solenoid and ground is allowed only when the engine is idle.

At the moment of starting and when the accelerator lever 22 is in the position corresponding to the idling of the engine while the change speed gear is in its inoperative neutral position, the output of the solenoid is electrically grounded.

As soon as the change speed lever 31 is in its starting position, the circuit is closed, current passes and the piston 15 is drawn towards the solenoid 27 providing for the application of the depression through 13 and 15 to the chamber 7. The vehicle is thus declutched. Upon acceleration, the current is switched off at 41 and the solenoid is no longer grounded and can no longer act on the piston 15 which returns towards the left. The depression-feeding pipe 13 is closed and air returns behind the diaphragm through 17—15—8 and 7. The clutch disc submitted to the action of its spring returns gradually against its plate and the vehicle starts. This arrangement shows the considerable advantage of not allowing any declutching through action on the switch-controlling knob carried by the change speed lever as long as the accelerator is not in its idling position, which leads to the necessity of releasing the accelerator for declutching automatically at each change of speed, so as to avoid any risk of erroneous operation etc.

When it is desired to enter other speeds, it is sufficient to release the accelerator lever which returns into its position corresponding to idling, to depress the switch-controlling knob on the lever, which has for its result to draw the piston 16 electromagnetically towards the right hand side so as to provide for declutching and engagement in the desired speed.

The distributor illustrated in Fig. 2 may be executed without any spring such as 23 for returning the piston 16 into its original inoperative position. In this case, as illustrated in Fig. 4, the surface of the piston 16 that does not face the solenoid 27, may be submitted to the depression prevailing in the admission manifold of the engine through the agency of a small channel 45 connected with the pipe 13. The nut 18 is then omitted and the corresponding side of the hollow cylinder is closed.

The cross-section of the cylinder 9 assumes a size such that the force exerted by the depression on the piston is always less than the attractive force produced by the energization of the solenoid 15.

The electric switches may be of various types according to the conditions of application, and they may be of the pressure or blade type or executed in any other suitable manner. Similarly, the switch controlling the distributor for starting purposes is positioned according to requirements at the most convenient point which may be either on the actual change speed gear, the sliding gear of which may carry blade spring contact-pieces, or at any other suitable location.

Obviously, the arrangements of Figs. 2 and 4 may be executed in various different manners and in particular it is possible to substitute a mechanical control for the electromagnetic control described without any objectionable effect on the proper operation of the arrangement according to the invention.

Various modifications and improvements may be brought to the above disclosed arrangements. One of said improvements has for its object to provide the clutch with a high progressivity so as to allow a very smooth starting of the vehicle while retaining a very rapid movement of the control of the clutch during its inoperative stroke and ensuring the possibilities of a quick change in speed without any jerks.

It is a known fact that, in the case of a motor car provided with a disc clutch of the single or multiple type, the lever controlling the clutch thrust bearing for shifting the movable plate and on which is secured the clutch pedal or the control member on the above described diaphragm 1, has always a certain idle angular travel to perform at the moment of reengagement before the two clutch plates of which one is rigid with the driving flywheel come into actual engagement with each other through a friction lining.

In order to lose no time at the moment of the starting during the idle stroke of the lever or during the changes in speed, it is of advantage to provide a very quick movement of the lever during its inoperative stroke, i. e. when it is shifted without the two plates being in contact. But it is necessary, as soon as the latter come into contact, chiefly at the start, to avoid any jerks as may occur, through a perfectly gradual application of the two plates against the friction lining which may allow the latter to skid slightly during the gradual expansion of the springs. To this end, it is necessary for the clutch lever to return only slowly into its original clutch-engaging position as soon as the different plates and discs begin to come into contact.

An arrangement answering these requirements will now be disclosed with reference to Fig. 5 illustrating cross-sectionally a modified distributor. Said distributor includes, as precedingly, a metal body 10 bored throughout its length at 11 and provided with a projection 12 the bore 13 in which connects said bore 11 with the admission pipe of the engine.

Inside the bore 11 of the body 10 may slide with slight friction a piston 16 provided as precedingly with a peripheral groove 17 through which the piston 16 allows connection between the bore 13 and the pipe 15 connected with bellows or the like means controlling the clutch plate, the piston 16 preventing such communication when shifted into its inoperative position illustrated.

According to the invention, the pipe 15 is arranged at 90° with reference to the bore 13 without this changing by any means the operation of the arrangement, as already disclosed. However, and as an additional feature with reference to the arrangement provided in Figs. 1 to 4, a cylinder 45 that is axially bored is carried by the body 10, the bore in said cylinder opening into the bore 11 through the wide opening 46. Inside said cylinder 45 may move a piston 47 carrying a piston rod 48 passing through a nut 49 screwed over the cylinder 45, said piston 47 being drawn downwardly by a spring 50 held fast between the nut 49 and a washer 51 rigid with the piston rod.

Large channels 52 are provided in the body of the cylinder 45 and open on one hand into the outer atmosphere at 53 and on the other hand into a free space 54 provided between the inner end of the piston 47 and the opening 46 when the piston is drawn downwardly towards the nut 49 by the spring 50. Consequently, the space 15 is then connected freely with the outer atmosphere when the piston 16 is drawn towards the left hand side of the bore 11 as illustrated in Fig. 5. A further solenoid 55 is provided round the periphery of the cylinder 45 and is positioned between the body 10 and a carrier flange 56 on the body of the cylinder 45. Said solenoid 55 is electrically connected through a wire 57 with a contact piece 58 so as to provide for the passage of current through said solenoid when said contact piece 58 is engaged by a projection 59 or the like part carried by the clutch-controlling lever 60. The operation of this modified arrangement is as follows:

When the piston 16 has returned towards the left, the outer air, instead of passing through the single bore 25 controlled by the needle valve 26, passes also through the channels 52, that are not throttled, into the pipe 15 opening into the bellows or the like expansible chambers to fill the latter. As this entrance of air is very rapid, the bellows associated with the control of the clutch return speedily towards their clutch-engaging position. This continues until the moment at which the projection 59 on the clutch lever comes into contact with the contact-piece 58 and hence-forward current passes through the solenoid 55 so as to attract the piston 47 upwardly, which has for its result to cut off the connection between the channels 52 and the opening 46. At this moment, the outer air can no longer enter the arrangement otherwise than through the channel 25 in predetermined adjustable amounts and this allows only a slow and gradual return of the bellows into their fully expanded position and consequently also of the clutch and plates from the moment onwards at which they begin coming into contact. This provides a very smooth and gradual operation. The angle $\alpha$ is that corresponding to the angular shifting of the clutch lever 60 when executing its inoperative stroke while the angle $\beta$ has a substantially lesser amplitude corresponding to the remaining stroke of the clutch plate, the final shifting of the lever 60 and the return of the clutch into its completely engaged position in association with the thrust bearing and the springs being obtained during this angular shifting $\beta$.

This may best be seen in the circuit diagram of Fig. 5A. The grounded storage battery $a$ is connected through the usual ignition switch $b$ to one terminal of the ignition system induction coil $c$ and thence to the solenoid windings 27 and 55 as described above. The switch $e$ grounds the circuit through switch 58 to solenoid 55 in the starting speed positions of gear shift lever 31, namely low gear and reverse. This prepares the solenoid 55 to become energized when the clutch actuating rod 5 has moved to a position where the clutch begins to engage. At this point, switch 58 closes, solenoid 55 is energized, plunger 47 (Fig. 5) moves upwardly, and further air admitted to vacuum chamber 7 is constrained to flow through the needle valve 26 whereby the clutch D engages gradually and smoothly during the remainder of the clutch-engaging stroke of clutch actuating rod 5.

The clutch disengaging solenoid 27 is energized when the engine is idling and the gear shift lever 31 is in either of the two starting speeds closing the switch $e$, this circuit being completed through the accelerator switch 41 which opens when the throttle lever 22 of carburetor C is moved in a counterclockwise direction in response to pressure on the accelerator pedal 22a. Application of pressure to the accelerator pedal 22a allows switch 41 to open and de-energize the clutch disengaging solenoid 27 so that it will move rapidly toward its engaging position at which point switch 58 closes as described above. The clutch may be disengaged at any time by pressure on the push button switch 36 mounted on the gear shift lever 31, and this button will ordinarily be used when shifting gears after starting, the clutch action being unaffected by the solenoid 55 whose circuit is opened by switch $e$ except in the starting speed positions of gear shift lever 31.

The engagement of the contact piece 58 provides for the passage of current towards the solenoid 55 and its position may be adjusted accurately so as to operate as soon as the inoperative stroke of the clutch is at an end and as soon as the plates begin coming into contact. Said contact piece 58 may furthermore be located at any other convenient position in suitable relationship with the shifting of the lever.

It should be remarked that this contact piece 58 is engaged during the time that is strictly required and that it may be adjusted in a very accurate manner. The operation of the clutch may thus be very rapid while remaining smooth and gradual as soon as this becomes necessary.

If it is deemed necessary, the piston 47 may be operative only for starting speeds say first forward and first reverse, this being obtained by connecting the circuit of the solenoid 55 with the circuit controlled by the gear level when engaging said starting speed.

The details of execution of the arrangement according to the invention have been given solely by way of exemplification and constructional modifications may be provided without unduly widening the scope of the invention as defined in accompanying claims.

Thus, the piston 47 may be controlled mechanically by the clutch lever through the agency of a rod in antagonism with a spring, while said rod is locked against movement through energization of an electromagnetic winding when a speed is provided that is different from starting speed.

A further modification consists, in contradistinction with the embodiment of Figs. 1 to 4, in placing the contact-piece 41 of Fig. 3 in operative relationship with the idling of the engine no longer between ground and the solenoid 27 but in the shunt circuit feeding current towards the contact-piece 39 of Fig. 1 controlled by the starting speed. Thus it is possible to accelerate the engine when inoperative without producing the starting speed, provided the electric switch 30 that is carried by the change speed lever is then closed.

On the other hand, the arrangement may be improved by providing automatic declutching as soon as the motor when braked suddenly by reason of some incident on the road has returned to idling speed (500 to 700 R. P. M.) before the driver has had time to depress the knob controlling the switch on the change speed lever.

To this end, it is possible to provide a separate energization of the solenoid 27 controlling the distributor piston 16, through the agency of a system of small expansible weights controlling an electric switch closing the circuit as soon as the engine sinks to an idling speed at about 500 to 700 R. P. M. It is also possible to provide a switch closing the circuit as soon as the generator that is adjusted for feeding only beyond this small number of revolutions per minute feeds no current.

This arrangement does not modify by any means the important fact according to which the engine may act as a brake when operative with its clutch engaged for all speeds other than starting speeds when the accelerator is released, as the automatic disengagement of the clutch can operate only upon idling of the engine, i. e. when the motor vehicle is almost at a standstill.

A non return valve may also be inserted in the air pipe connecting the distributor with the manifold of the engine.

The above arrangements are applicable also to all vehicles equipped with diesel engines associated with an air compressor. The operation of the clutch will then be performed through the pressure of air exerted on an element such as a piston which in this case would take the place of the diaphragm 1.

In the modification illustrated in Fig. 6, 10 designates the distributor cylinder as precedingly, the outer end of which is surrounded again by a solenoid 27.

Inside the cylinder may move a piston or slide valve including two parts: a portion on the left hand side of Fig. 6 engages with slight friction a part of the cylinder 10 of a small diameter while the right hand side $16^1$ is fitted with some clearance inside an enlarged part of the cylinder. The part 16 of the piston is made for instance of copper so as not to be liable to magnetisation and to not retaining any metal particles that would be liable to produce jamming, while the part $16^1$ is made of soft iron and is submitted to the attraction of the solenoid. A return spring $23^1$ is fitted between the part $16^1$ of the piston and a securing plug $18^1$ screwed into the corresponding end of the cylinder. 12 designates again the projection provided with the bore 13 that serves for connecting the inside of the cylinder 10 with the engine admission pipe; similarly the projection 14 is again bored at 15 for connection with the pipe opening into the bellows or the like means actuating the clutch plate; lastly, 25 designates the pipe through which air is allowed to enter the cylinder under control of the adjustable needle valve 26.

As disclosed hereinabove with reference to Fig. 5, means are provided for allowing a rapid operation of the clutch during its inoperative stroke, said operation being very gradual and smooth as soon as the plates and discs begin engaging each other; but the variations in the input of air are in the present case defined by the movements of and mechanical control afforded by the actual piston of the distributor.

To this end, the cylinder 10 is provided at 61 with a large opening for the input of air while $61^1$ forms a third input of air connected with the inside of the pipe 62 extending into an auxiliary distributor comprising two small plates 63 and 64 perforated respectively at 65 and 66, of which perforations 65 is stationary while the other perforation 66 is movable. These openings or perforations do not register except at starting speed whereby for any other speed, the third air input opening 61 can receive no outer air.

As soon as the piston has returned towards the left hand side as illustrated after closing the communication between the bores 13 and 15 providing for connection of the bellows with the input of the engine, said piston uncovers the openings 25 and 61 so as to provide a somewhat considerable input of air into 15. The bellows return thus rapidly towards their original position but at a certain moment corresponding to the beginning of the engagement between the clutch disc and the cooperating plate, piston rod 67 forming an outer extension of the piston 16 engages a cam 68 or the like suitable member rigid with the rod 5 illustrated in Fig. 1 that connects the bellows with the clutch lever. Consequently, at this moment, the piston 6 is urged back by the latter towards the right hand side by a length sufficient for covering the opening 61 so as to allow the air to enter only through the bore 25 with a view to filling the bellows.

When the vehicle is running, the opening $61^1$ allows, for the intermediary speeds exclusively, a more speedy input of air as soon as the opening 61 has been covered which allows losing no time at the moment of a change of speed.

However, the distributor is designed in a manner such that this supplementary input of air is not possible when starting and to this purpose, the perforated plates 63 and 64 are resorted to and the auxiliary distributor formed by them is suitably controlled in a manner such that the perforations 65 and 66 may not lie in front of one another when the change speed lever is set in starting speed position. The output provided through the opening $61^1$ may be adjusted by means of an interchangeable jet.

The perforated plates 63 and 64 may be replaced by any other arrangement adapted to serve the same purpose and it is possible for instance to provide to this end an electric control constituted by a needle valve controlled by a solenoid.

Figs. 7 and 8 relate to a modification wherein the distributor includes a cylinder 70 communicating through its medial part with the bellows through a connection 71 while one of its ends is connected with the suction manifold of the engine as illustrated by the pipe 72 and the threaded connection 73 screwed over the cylinder 70. The electrical circuit is shown in Fig. 5A.

Each end of the cylinder 70 is closed by small stationary plates 74 and 75 cooperating each with a rotary plate 76 or 77 keyed to a common spindle 78 passing through the plate 74 and controlled on the outside of the distributor by the solenoids $27^1$ and $55^1$ acting through the lever $78^1$ appearing more clearly in the plan view of Fig. 8. Said solenoids $27^1$ and $55^1$ may be considered as equivalent to the solenoids 27 and 55 described with reference to Fig. 5.

The rotary plates 76 and 77 are perforated respectively at 80 and 81 and the perforation 80 may be adapted to register with a perforation 79 in the stationary plate 75 to allow communication between the engine suction manifold and the bellows through the pipe 72, said perforations 79 and 80, the inside of the cylinder 70 and the connection 71. The stationary plate 74 is similarly provided with a perforation 82 of a comparatively considerable diameter and a small perforation 83.

It is apparent from inspection of Figs. 9, 9A, 9B and 10, 10A and 10B that when the solenoid $27^1$ provides for a rocking of the rotary plates 76—77 in clockwise direction, the perforation 82 in the stationary plate 74 will no longer register with a perforation 81 in the plate 77 (Fig. 9A). In contradistinction, at this moment the perforation 80 of the other rotary plate 76 will register with the port 79 of the plate 75 (Fig. 10A) and connection is established between the suction of the engine and the bellows through connection 71 as illustrated. This provides for declutching.

For ensuring a rapid return of the clutch, no current passes any longer through the solenoid 27¹ and the spindle returns into its original position so that the outer air enters through the large perforation 82 registering now with 81 (Fig. 9) while connection is cut off between the perforations 79 and 80 towards the engine (Fig. 10), the suction of which is no longer connected with the bellows.

At a predetermined moment and in a manner already disclosed with reference to Fig. 5, the solenoid 55¹ will be energized through the return movement of the clutch lever whereby the small plates 76 and 77 rotate anti-clockwise so that the perforation 81 is caused to register with the small gauged perforation 83 (Fig. 9B). This provides for a slow return of air towards the bellows while 80 and 79 are again in register (Fig. 10B). The operation is thus the same as that disclosed hereinabove.

From another standpoint, it may be of interest to provide for automatic declutching for predetermined running conditions approximating idling conditions, in addition to the arrangement disclosed hereinabove, this being provided by inserting in the circuit of the solenoid 27, as illustrated in Fig. 11, a switch 91 controlled by the oil pressure in the crankcase of the engine; the arrangement is such that said switch will provide for the passage of current under low speed conditions for which the oil pressure is very low, said switch opening the circuit as soon as the speed rises above a predetermined value, say 500 to 1000 R. P. M. or thereabouts, according to the case, as soon as the oil pressure increases. This switch may be adjusted by a gauged spring. It is, in fact, possible to consider also adjustment through a thermostat in order to take into account the changes in pressure produced by the differences in temperature that may arise in the oil.

In the case of the use of said system incorporating a control through the output of oil or the voltage provided by the generator acting on a switch 91 similar to that of Fig. 11 and inserted at the same location, and if it is desired to prevent declutching when the change speed lever is in neutral, further switches may be provided for control by speeds other than a starting speed, whereby the energization provided by the automatic switch may be operated only through such complementary switches while the passage of current is broken for the neutral position of the gear lever, no switch being provided for such a position to allow automatic energization of the solenoid.

The arrangement controlled by the output of current from the generator and by the pressure of oil have for their advantage to allow at different speeds an automatic declutching for accurately defined running conditions of the engine and consequently for an actual speed of the vehicle that differs, of course, according to the intermediary speed of the change speed box engaged by the gear lever. The disconnection of the clutch is provided for instance in the case of a four-speed car for an absolute speed of the vehicle that is higher for the fourth speed, that is less for the third and still less for the second speed. This manner of proceeding allows using the engine as a brake for intermediary speeds when the vehicle is running at a speed that decreases gradually towards complete stoppage. Furthermore, the arrangements considered are easily and cheaply fitted on the engine, whereas, if it is desired to obtain similar results with the regulator including small weights as referred to hereinabove, it is necessary to control said regulator through the engine which would lead to a complicate mounting.

If so desired, the disconnection for starting speeds may be provided simply by resorting to the sole switch 91 providing for the passage of current under low speed conditions through the electromagnet 27, either under control of the output of the generator or under the control of oil pressure because, for such speeds and when the engine is idling, the switch 91 closes the circuit feeding the solenoid 27 so as to declutch the vehicle. During accelera-tion, the switch 91 is opened so that the reengagement of the clutch is provided for starting.

In this latter embodiment, the automatic switch controlled by oil pressure or by the generator may replace possibly for the starting the mechanical switch controlled by the accelerator.

However, in practice, it is preferable to retain the switch disclosed hereinabove and controlled by the starting speeds and by the accelerator with a view to obtaining more easily a smooth and gradual starting and the rapid passage through the intermediary speeds, while providing for automatic declutching under low speed conditions, as illustrated again in Fig. 12 to which are incorporated parts 92—93 providing for an additional operation as disclosed hereinafter.

It is also possible to provide, together with the automatic declutching for low running speeds of the engine, a switch within the driver's reach for opening the circuit when the engine revolves while the vehicle is at a standstill and the change speed lever is in its neutral position, in order to prevent declutching for such a position. This avoids providing switches operating at each change of speed as referred to hereinabove.

In the case of the incorporation of the automatic switch 91, the switch 30—36 on the change speed lever is retained because if the speeds are changed while the engine revolves at a speed above the low predetermined speed selected for automatic declutching, said switch 91 opens the circuit leading to the solenoid 27 which should then be controlled by the switch 36 referred to for disengaging the clutch.

A further possibility of not declutching when the engine revolves while the vehicle is at a standstill, consists in providing on the starting point of the cable leading to the speedometer, i. e. in connection with the actual speed transmission (Fig. 12), a system of small weights illustrated diagrammatically at 92 or any other equivalent means for opening the switch 93 when the car is at a standstill.

The starting is operated normally through a switch 40—41 controlled by the accelerator lever 22 similar to that of Fig. 3 associated with the usual switches controlled by the starting speed at 32, to wit through the contact piece 39 for forward speed and through the contact piece 39¹ for reverse.

It is apparent that when the vehicle starts, the centrifugal regulator or the like is adjusted for closing immediately the circuit at 93 while no current passes through the automatic switch 91 in series therewith, until the vehicle is actually running. The engine may thus revolve while the vehicle is at a standstill and the gear lever in its neutral position without the clutch being disconnected.

What we claim is:

1. An automatic clutch control system for vehicles driven by internal combustion engines incorporating a source of pressure different from atmospheric pressure, comprising a clutch, means operable by the pressure of said source controlling said clutch, a bored distributor body, a slide valve slidingly carried inside the bore in said distributor body, a pipe connecting the inside of the distributor bore permanently and operatively with the pressure operable means, a second pipe connecting the inside of the distributor bore with the source of pressure, a ventilation port opening into the distributor bore, the slide valve providing in a first position for the closing of the second pipe and the uncovering of the ventilation port and in a second position for the uncovering of the second pipe for connecting same with the first pipe while closing the ventilation port, means permanently urging the slide valve into the first mentioned position, electromagnetic means adapted when energized to exert an action on the slide valve overcoming that of the last mentioned means to urge the piston into the second position considered, a circuit feeding said electromagnetic means, a change speed box, a gear lever controlling same, two switches inserted in parallel in said circuit and adapted to energize selectively said circuit, means for manually operating one of said switches and means whereby the gear lever controls the second switch when it is in the position corresponding to a predetermined speed.

2. An automatic clutch control system for vehicles driven by an internal combustion engine incorporating a source of pressure different from atmospheric pressure, comprising a clutch, means operable by the pressure of said source controlling said clutch, a bored distributor body, a slide valve slidingly carried inside the bore in the said distributor body, a pipe connecting the inside of the distributor bore permanently and operatively with the first mentioned pressure operable means, a second pipe connecting the inside of the distributor bore with the source of pressure and adapted to be closed by the slide valve for a predetermined position thereof, a ventilation port opening into the distributor bore and adapted to be closed by the slide valve for another position of the slide valve, means for permanently urging the slide valve into the first mentioned position, means stronger than the preceding means adapted to urge the slide valve into the second position considered, a change speed box, a gear lever controlling same, means controlled by the gear lever to provide for operativeness of last mentioned stronger means for at least one of the positions to be assumed by the lever, an accelerator lever for the engine, a mechanical connection between said accelerator lever and the slide valve and adapted to prevent operation of last mentioned lever-controlled means when the accelerator is actuated.

3. An automatic clutch control system for vehicles comprising driving means driven by an internal combustion engine, said engine including a source of air under pressure different from atmospheric pressure, said control system comprising: a clutch; air pressure actuated means for operating said clutch; governing means adapted to move between an inoperative clutch engaging position and an operative clutch disengaging position for selectively connecting said pressure actuated means either with the atmosphere or with said source of air pressure, respectively; means normally urging said governing means yieldingly into its inoperative position; electromagnetic means for moving said governing means from its inoperative position to its operative position against the yielding action of said normally urging means; variable ratio gear shift transmission means adapted to couple said engine to said driving means through said clutch, said gear shift means comprising a manually operable lever having a plurality of individually selectable positions for changing the speed ratio thereof; an electrical circuit including a first switch means operative in at least one of said positions of said lever for causing said electromagnetic means to move said governing means to its operative position to cause disengagement of said clutch; control means connected to control the position of said governing means, said control means being ineffective during idling of said engine and becoming effective when said engine is caused to operate at a speed appreciably higher than its idling speed to cause said governing means to move to its inoperative position notwithstanding operativeness of said first switch means; and manually operable switch means disposed in proximity to the portion of said lever which is used for the manual operation thereof, said manually operable switch means being connected to said electrical circuit independently of said first switch means for causing said electromagnetic means to move said governing means to its operative position in response to operation of said manually operable switch means irrespective of the position of said lever.

4. A clutch control system according to claim 3, wherein said manually operable switch means is carried by said manually operable lever.

5. An automatic clutch control system for vehicles comprising driving means driven by an internal combustion engine, said engine including a source of air under pressure different from atmospheric pressure, said control system comprising: an accelerator pedal for controlling the speed of said engine; a clutch; air pressure actuated means for operating said clutch; governing means adapted to move between an inoperative clutch engaging position and an operative clutch disengaging position for selectively connecting said pressure actuated means either with the atmosphere or with said source of air pressure, respectively; means normally urging said governing means yieldingly into its inoperative position; electromagnetic means for moving said governing means from its inoperative position to its operative position against the yielding action of said normally urging means; variable ratio gear shift transmission means adapted to couple said engine to said driving means through said clutch, said gear shift means comprising a movable member having a plurality of individually selectable positions for changing the speed ratio thereof; and electrical circuit including a first switch means operative in at least one of said positions of said movable member for causing said electromagnetic means to move said governing means to its operative position to cause disengagement of said clutch; and control means connected to control the position of said governing means, said control means being ineffective during idling of said engine and becoming effective when said engine is caused to operate at a speed appreciably higher than its idling speed to cause said governing means to move to its inoperative position notwithstanding operativeness of said first switch means, said control means comprising a mechanical connection from said accelerator pedal to said governing means for urging said governing means toward its inoperative position against the action of said electromagnetic means upon movement of said accelerator pedal to increase the speed of said engine appreciably above its idling speed.

6. An automatic clutch control system for vehicles comprising driving means driven by an internal combustion engine, said engine including a source of air under pressure different from atmospheric pressure, said control system comprising: an accelerator pedal for controlling the speed of said engine; a clutch; air pressure actuated means for operating said clutch; governing means adapted to move between an inoperative clutch engaging position and an operative clutch disengaging position for selectively connecting said pressure actuated means either with the atmosphere or with said source of air pressure, respectively; means normally urging said governing means yieldingly into its inoperative position; electromagnetic means for moving said governing means from its inoperative position to its operative position against the yielding action of said normally urging means; variable ratio gear shift transmission means adapted to couple said engine to said driving means through said clutch, said gear shift means comprising a movable member having a plurality of individually selectable positions for changing the speed ratio thereof; an electrical circuit including a first switch means operative in at least one of said positions of said movable member for causing said electromagnetic means to move said governing means to its operative position to cause disengagement of said clutch; and control means connected to control the position of said governing means, said control means being ineffective during idling of said engine and becoming effective when said engine is caused to operate at a speed appreciably higher than its idling speed to cause said governing means to move to its inoperative position notwithstanding operativeness of said first switch means, said control means comprising further switch means actuable by said accelerator pedal upon movement thereof to increase the speed of said engine above its idling speed, said further switch means being included in said electrical circuit together with said first switch means, said further switch means, when actuated by said pedal, causing said electromagnetic means to permit said normally urging means to move said governing means to its inoperative position.

7. An automatic clutch control system for vehicles comprising driving means driven by an internal combustion engine, said engine including a source of air under pressure, different from atmospheric pressure, said control system comprising: a clutch; air pressure actuated means for operating said clutch; governing means adapted to move between an inoperative clutch engaging position and an operative clutch disengaging position for selectively connecting said pressure actuated means either with the atmosphere or with said source of air pressure, respectively; means normally urging said governing means yieldingly into its inoperative position; electromagnetic means for moving said governing means from its inoperative position to its operative position against the yielding action of said normally urging means; variable ratio gear shift transmission means adapted to couple said engine to said driving means through said clutch, said gear shift means comprising a movable member having a plurality of individually selectable positions for changing the speed ratio thereof; an electrical circuit including a first switch means operative in at least one of said positions of said movable member for causing said electromagnetic means to move said governing means to its operative position to cause disengagement of said clutch; control means connected to control the position of said governing means, said control means being ineffective during idling of said engine and becoming effective when said engine is caused to operate at a speed appreciably higher than its idling speed to cause said governing means to move to its inoperative position notwithstanding operativeness of said first switch means; a movable clutch control member actuable by said pressure actuated means for engagement of said clutch, the clutch engaging movement of said clutch control member comprising a preliminary portion during which said clutch remains disengaged and an active portion during which clutch engagement progressively takes place; flow restricting means adapted to be included in the connection between said pressure actuated means and the atmosphere when said governing means is in its inoperative position; further electromagnetic means coupled to said flow restricting means and actuable to include said flow restricting means in said atmospheric connection for causing said flow restricting means to restrict the flow of air between said pressure actuated means and the atmosphere; and a further electrical circuit including a second switch means and said further electromagnetic means, said second switch means being actuated by said clutch control member during clutch engaging movement thereof substantially at the point of transition from said preliminary portion of said movement to said active portion thereof, said second switch means being connected to cause said electromagnetic means to act upon said flow restricting means to restrict said flow during said active portion of said movement of said clutch control member.

References Cited in the file of this patent

UNITED STATES PATENTS

| | | |
|---|---|---|
| 1,946,200 | Easter | Feb. 6, 1934 |
| 2,058,586 | Heiss et al. | Oct. 27, 1936 |
| 2,083,530 | Hill | June 8, 1937 |
| 2,175,219 | Sanford | Oct. 10, 1939 |
| 2,181,470 | Velo | Nov. 28, 1939 |
| 2,197,721 | Goepfrich | Apr. 16, 1940 |
| 2,259,599 | Zeller | Oct. 21, 1941 |
| 2,263,047 | Newton | Nov. 18, 1941 |
| 2,280,002 | Neracher | Apr. 14, 1942 |
| 2,296,290 | Mayrath | Sept. 22, 1942 |
| 2,341,756 | Avila | Feb. 15, 1944 |
| 2,492,923 | Moore et al. | Dec. 27, 1949 |